United States Patent [19]

Walrath et al.

[11] Patent Number: 5,212,799
[45] Date of Patent: May 18, 1993

[54] METHOD AND APPARATUS FOR STORING A DATA BLOCK IN MULTIPLE MEMORY BANKS WITHIN A COMPUTER

[75] Inventors: Craig A. Walrath, Easley; Gene F. Young, Lexington; Terry S. Strickland, Greenville; Michael R. Hilley, Belton, all of S.C.

[73] Assignee: NCR Corporation, Dayton, Ohio

[21] Appl. No.: 739,114

[22] Filed: Jul. 31, 1991

[51] Int. Cl.$^5$ .................... G06F 12/00; G06F 12/16
[52] U.S. Cl. ...................... 395/800; 364/DIG. 1; 364/DIG. 2; 364/962; 364/962.1; 364/969; 364/246; 364/246.6; 364/246.8
[58] Field of Search ............ 395/DIG. 1 MS File, 395/DIG. 2 MS File, 200, 250, 325, 400, 425, 658, 800

[56] References Cited
U.S. PATENT DOCUMENTS
4,675,811 6/1987 Kishi et al. ................. 395/425

Primary Examiner—Robert B. Harrell
Attorney, Agent, or Firm—Gregory A. Welte; Paul J. Maginot

[57] ABSTRACT

In a computer, when a block of data is written to memory, it is common to attach a control word to the data. The control word is placed at a pre-arranged location, generally separate from the data. The control word contains important information about the data, such as starting address, length, etc. The presence of the control word indicates that the data is valid.

Sometimes, for various reasons, the control word is written before all the data is written. This premature availability of the control word gives false information: the data is not yet completely written, yet the presence of the control word indicates otherwise. The invention prevents such a problem by preventing premature writing of the control word.

4 Claims, 8 Drawing Sheets

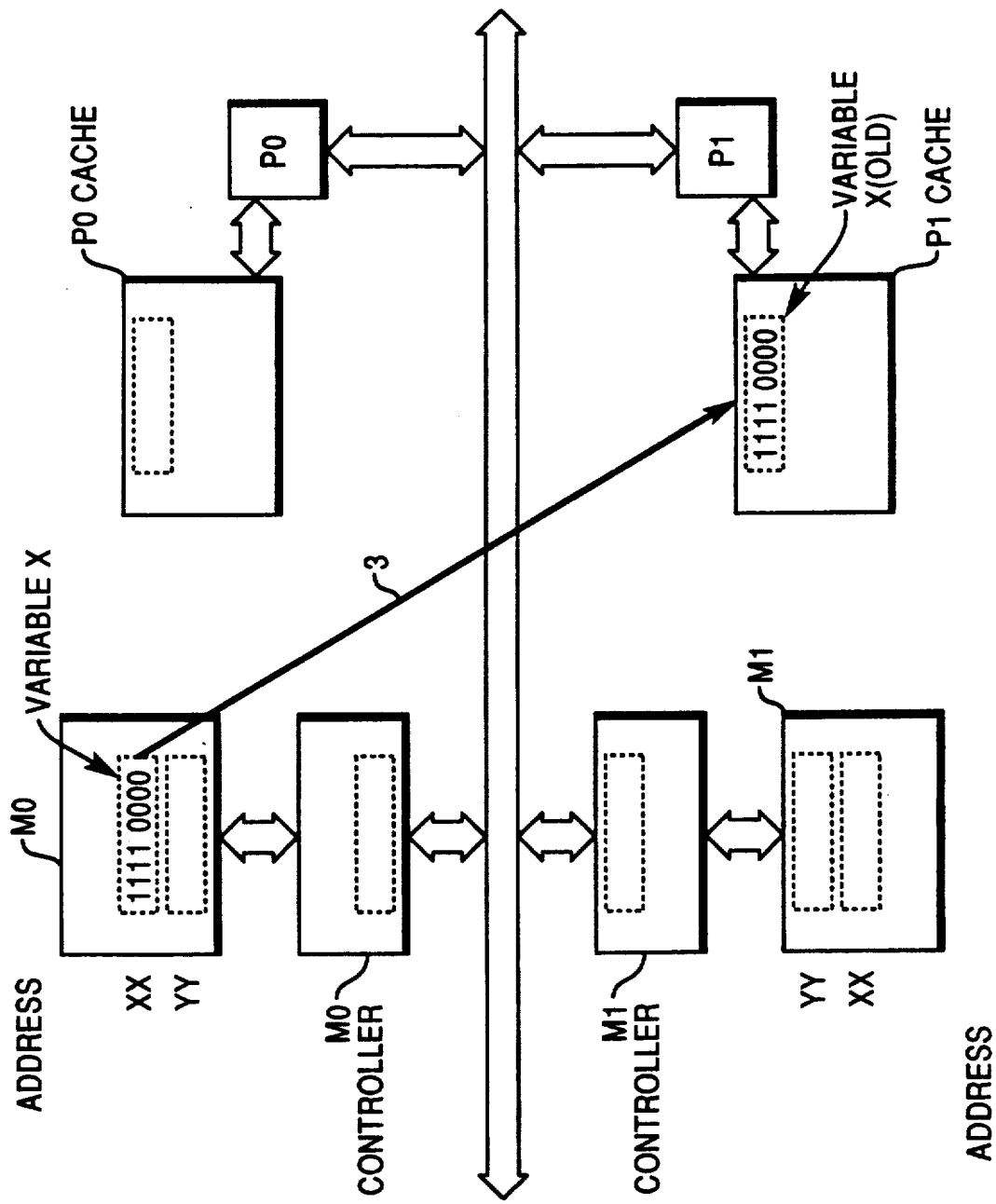

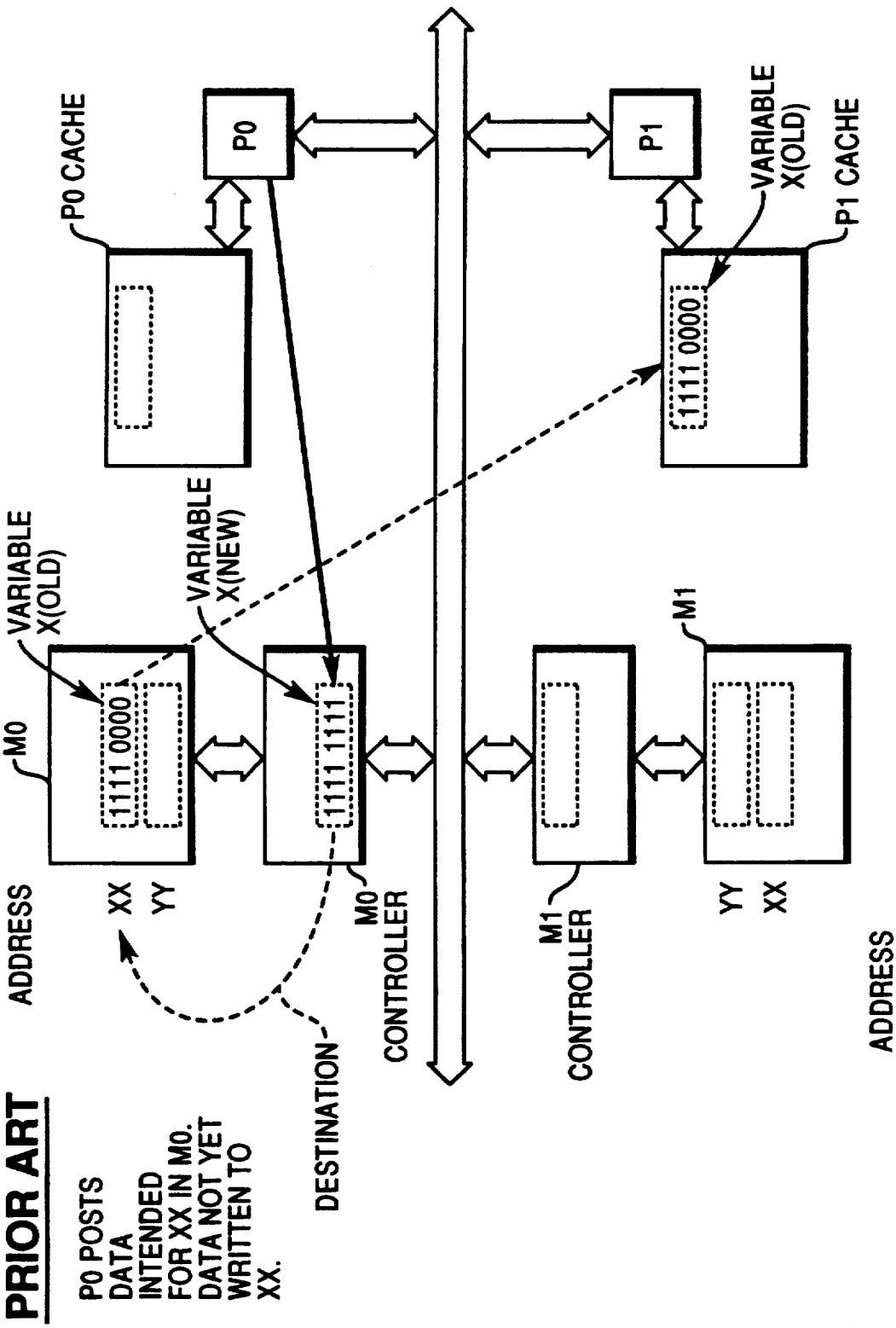

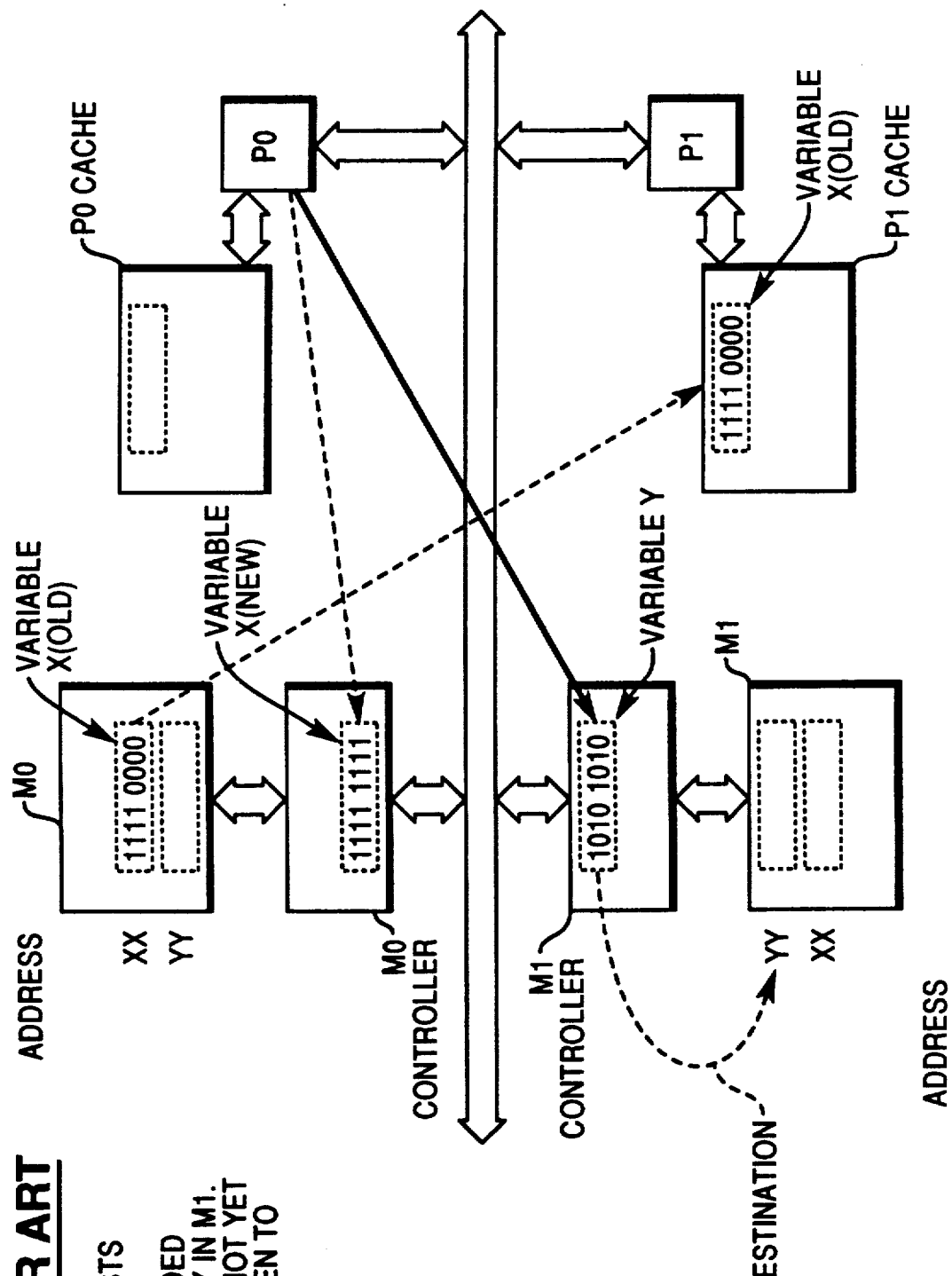

M1 CONTROLLER WRITES POSTED DATA.

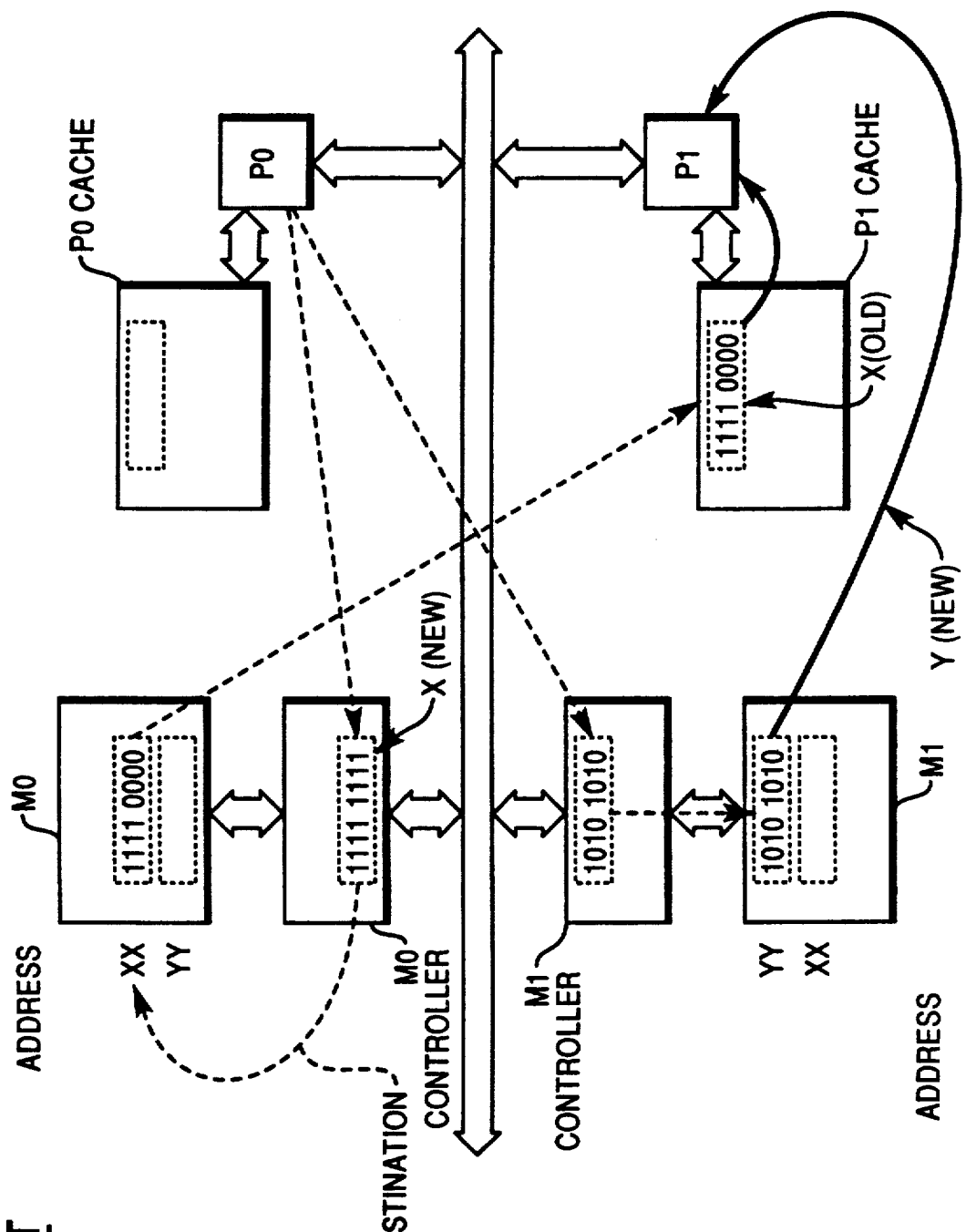

| | IN | | OUT | | | |
|---|---|---|---|---|---|---|
| PROCESSOR ID | WRITE REQ | WRITE COMPLETE | FF PWPOST_0 R   S | FF PWPOST_1 R   S | FF PWPOST_2 R   S | FF PWPOST_3 R   S |
| 0 0 0 | 0 0 1 | 0 1 0 | 0 0 1<br>0 1 0 | / | / | / |
| 0 0 1 | 0 0 1 | 0 1 0 | / | 0 0 1<br>0 1 0 | / | / |
| 0 1 0 | 0 0 1 | 0 1 0 | / | / | 0 0 1<br>0 1 0 | / |
| 0 1 1 | 0 0 1 | 0 1 0 | / | / | / | 0 0 1<br>0 1 0 |

METHOD AND APPARATUS FOR STORING A DATA BLOCK IN MULTIPLE MEMORY BANKS WITHIN A COMPUTER

In computers having memory distributed over several memory banks, it is common to divide a block of data into parts, and write each part to a different bank. The present invention concerns the order, or sequence, in which the parts are written.

BACKGROUND OF THE INVENTION

In some computer systems having multiple processors, a problem can result from "weak write ordering." The problem arises because many processors have access to the same parts of memory. One processor can modify the data, without other processors' knowledge, causing errors. An example, discovered by the inventors herein, will illustrate the problem.

Example

1. In FIG. 1A, processor P1 reads a byte, indicated as 1111 0000, located at address xx in memory bank M0, and places the byte into P1 CACHE. This byte will be called "VARIABLE X" or "X." This byte X will later have two values, X(OLD) and X(NEW), and is thus designated X(OLD) in P1 CACHE.

Comments: (A) In FIG. 1A, the dashed boxes, such as the one at address xx in M0, indicate memory cells.

(B) The path 3, and others like it in other figures, will remain in later figures, but in phantom, in order to assist the reader in remembering the origin of the data travelling the path 3.

2. In FIG. 1B, P0 attempts to change, or update, the value of X, by "posting a write" to this same address, namely, xx in M0. However, the actual change is not immediate: "posting a write" means that P0 delivers the byte X(NEW), not to M0 itself, but to a buffer in M0 CONTROLLER. The actual updating occurs when M0 CONTROLLER writes X(NEW) to M0, and will occur at a later time.

Comment: As will be seen shortly, the concurrent availability of both X(OLD) and X(NEW) is the source of the problem.

3. Next, in FIG. 1C, processor P0 posts a write to address yy in M1, by placing the byte into the buffer of M1 CONTROLLER. The byte is destined for address yy. This byte will be called "VARIABLE Y" or "Y."

4. Next, in FIG. 1D, M1 CONTROLLER writes Y to address yy in M1, as indicated in FIG. 1D. At this time, the posted Y has now become written.

5. Finally, in FIG. 1E, processor P1 attempts to read both X and Y. P1 correctly obtains Y from address yy in M1, but incorrectly obtains X(OLD) instead of X(NEW). The reason for the error is that P1 obtains X1 from P1 CACHE, which does not contain the new value of X, namely, X(NEW), which has been posted, but not yet written, in M0.

Real-World Example P0 is I/O Controller for Disc Drive

A real-world situation in which this type of problem can arise is the following. Assume that processor P0 is a controller which controls an Input-Output (I/O) operation in a computer, such as transmitting data to a disc drive. Assume that P1 is the Central Processing Unit (CPU).

P0 First Posts Data, such as X, Then Posts Control Word, such as Y

When P0 retrieves data from the disc drive, it then writes the data to memory. In writing, P0 first posts the data to the memory controllers. The posting of X(NEW) in step 2, above, is one example of such a posting. (In general, for most I/O operations there will not be a single posting of X, but postings of hundreds or thousands of such bytes.)

After P0 posts all of the data, P0 posts a "control word" at a pre-arranged location in memory. The control word, being posted after the data, may thus be called a "terminal word." In the Example given above, Y can represent the control word. The control word contains information about the data, and is needed by the CPU (or other processors) which later fetch the data. When the control word becomes available, as occurs when it is written, the availability indicates that the associated data is likewise available.

Y Can be Written Before X, Yet X was posted Before Y

When the CPU wishes to use the data (such as X in the Example) retrieved from the disc drive, P1 first fetches the control word (Y), and then proceeds to find the data and read it. In the example given above, the control word (Y) was written (to M1 in FIG. 1D) before the data obtained from the disc drive (X(NEW)) was written. P1, in obtaining the control word, Y, was mistakenly led to believe that the new data (X) was available. P1, in effect, used the data presently residing at xx in M0 as X. Thus, in reading P1 CACHE, P1 used X(OLD) instead of the correct data, X(NEW).

That is, the control word was made available before the new data was made available, and caused the CPU to read the wrong data (X(OLD)).

Therefore, the problem arose because the following sequence of events occurred:

1. First, X(OLD) was read into P1 CACHE.
2. Next, data was posted (e.g., X(NEW) was posted to M0 CONTROLLER in FIG. 1B). (The data may not be immediately written after posting, because the memory may be busy at that time.)
3. Next, the control word (Y) was posted (i.e., Y was posted to M1 CONTROLLER in FIG. 1C).
4. Then, control word (Y) was written (i.e., from M1 CONTROLLER to M1 in FIG. 1D) before the data (X(NEW)) was written, which falsely indicated that the data was ready to be read.

NOTE; WRITING is not complete until all stale (or old copies of the data have been invalidated in the processor caches.

5. Control word (y) was read; then data word X(OLD) was read from P1 CACHE.

This sequence indicates "weak write ordering." That is, the order (in time) in which the data is written to memory does not correspond to the order in which the data was posted by the processor: the last word posted (the control word) was the first word written.

(The term "multiple processors" was used above. This term includes any combination of more than one intelligent controller, such as CPUs, microprocessors, I/O controllers, DMA controllers, co-processors, etc.)

OBJECTS OF THE INVENTION

It is an object of the invention to provide a system which, during data transfers, prevents a terminal code word from being written prior to preceding data.

It is a further object of the invention to provide a system in which data, which is posted to multiple memory controllers, is written by the controllers in the same order as posted by the respective processors. (That is, the writes done by a given processor be completed in order, with respect to each other, not with respect to those of other processors.)

SUMMARY OF THE INVENTION

In one form of the invention, a block of data is divided into several parts, one part for each memory bank. Each memory bank has a controller. Each part is posted to a different controller, which holds the posted data and later writes the posted data to its respective memory bank. The invention prevents later-posted data from being written prior to earlier-posted data.

BRIEF DESCRIPTION OF THE DRAWINGS

FIGS. 1A, 1B, 1C, 1D, and 1E illustrate a sequence of events which cause a problem which the invention solves.

DETAILED DESCRIPTION OF THE INVENTION

Introduction

In brief, after a processor completes a posting to any memory bank, the processor is prevented from making further postings to that bank, and to all other banks, until the posted data is written. This procedure prevents the writing of later-posted data (including the terminal code word) before earlier-posted data, thus mitigating the problem described in the Background.

In another, optimized, embodiment, the processor would be allowed to post writes to the same bank, since the memory controller can complete writes in the proper order, if they are to the same bank.

Description

Figure 1D:
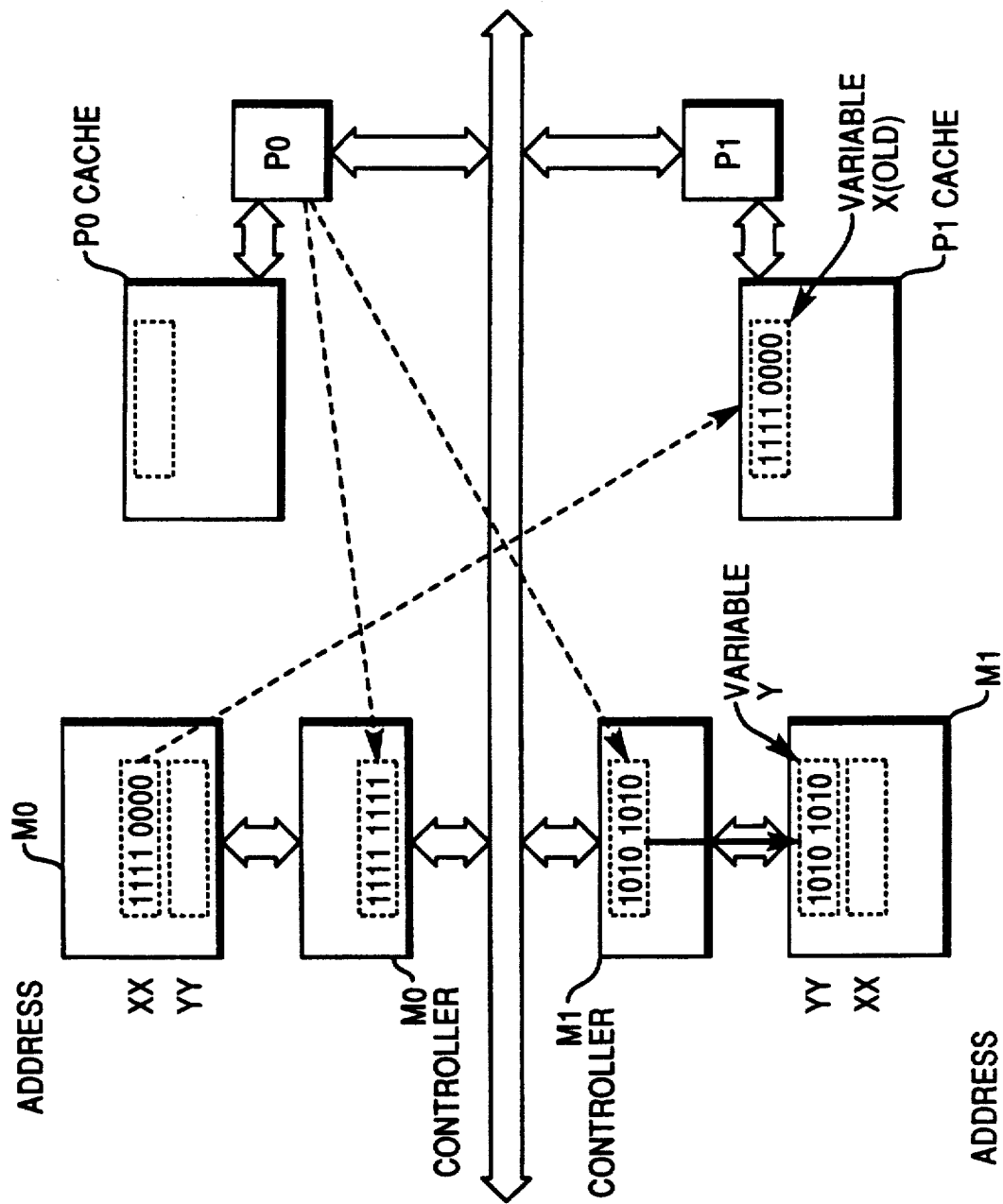
Figure 2:
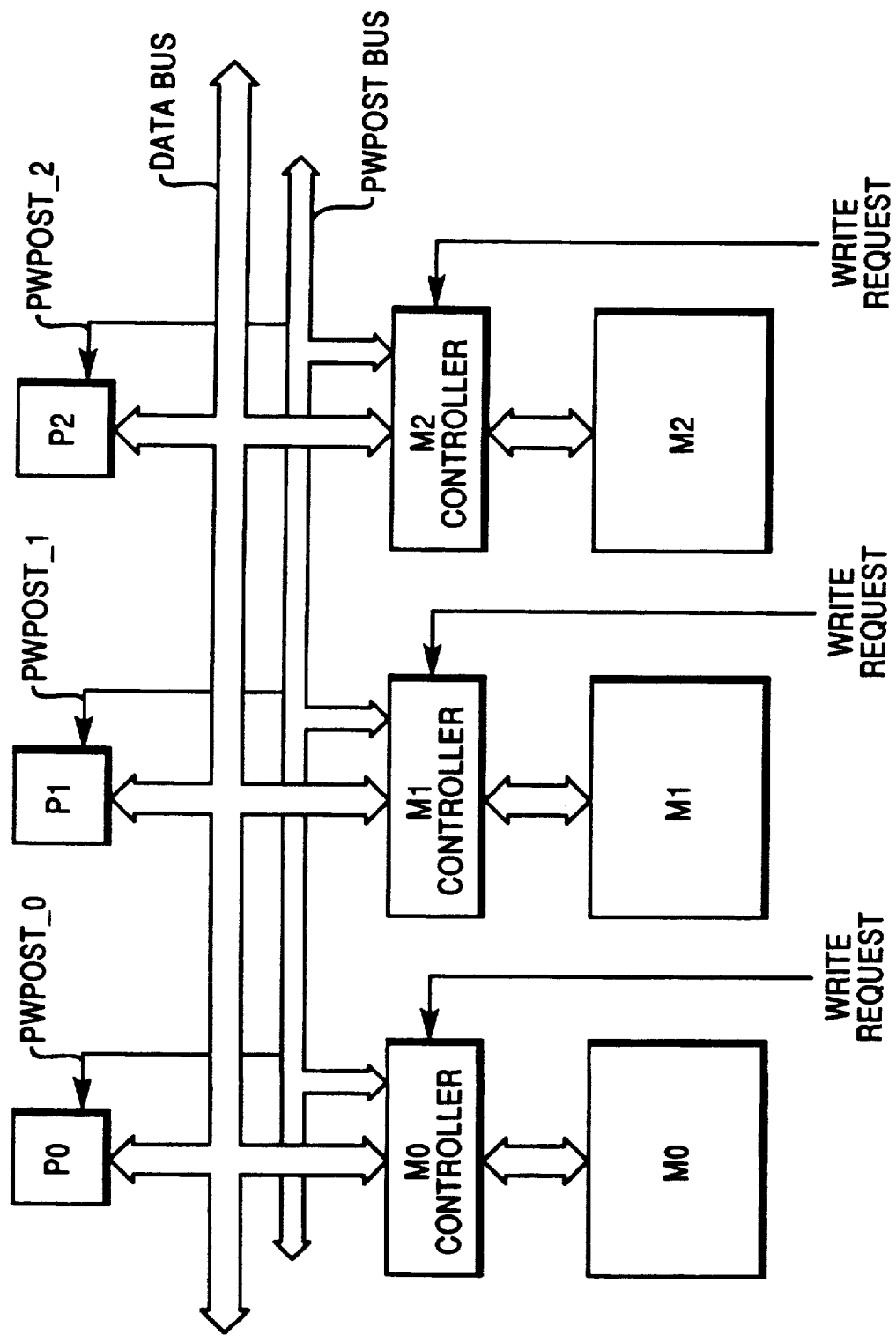
FIG. 2 illustrates one type of computer architecture which the invention utilizes in preventing the problem described in connection with FIG. 1.

Controller Activates PWPOST Line of Processor When Processor Initiates Write Operation In FIG. 2, three processors are shown, P0, P1, and P2. A PWPOST BUS carries three control lines, PWPOST_0 through PWPOST_2, one for each of the three processors. Whenever a processor initiates a posting, the memory controller receiving the posted data activates the PWPOST line for that processor. For example, if processor P2 initiates a posting to M1, M1 CONTROLLER pulls line PWPOST_2 active, indicating that P2 initiated a write operation by posting data. The M1 CONTROLLER holds the PWPOST line active until M1 CONTROLLER writes the data which was posted.

(Actually, M1 holds PWPOST active until the proper actions have been taken, namely, the cache line has been inactivated if necessary and the memory write has started.)

Processor Prohibited From Further Writes While Its PWPOST Line Is Active

Figure 3:
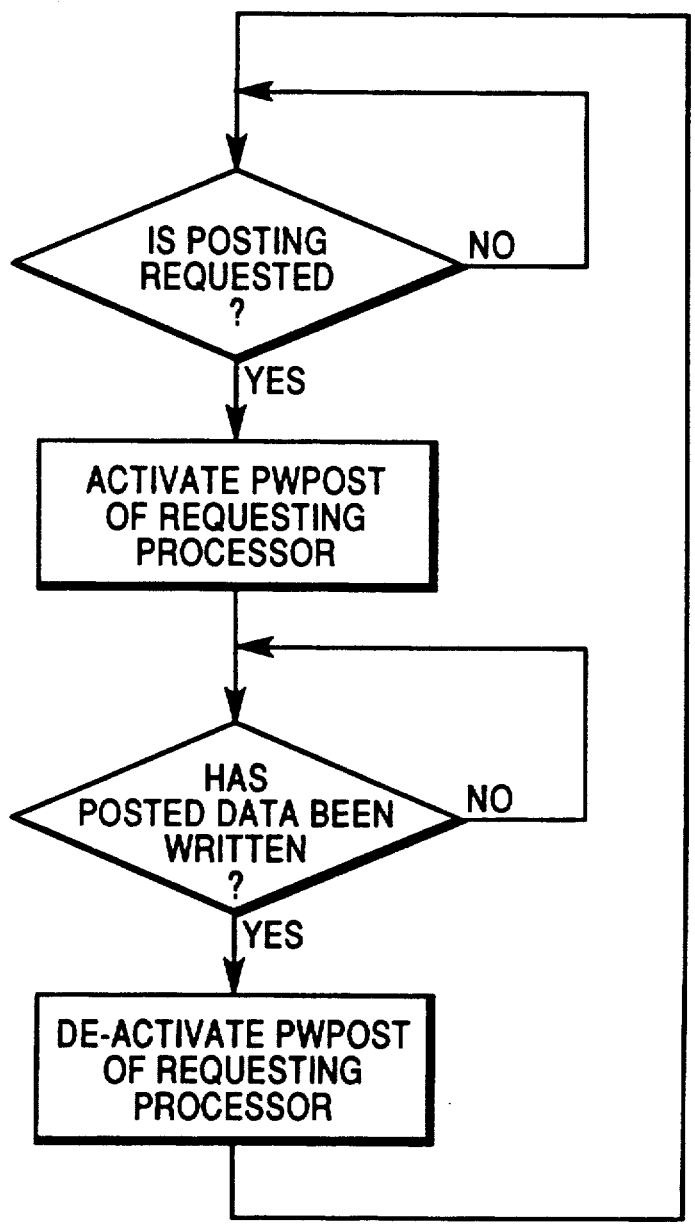
FIG. 3 illustrates apparatus, contained in each controller of FIG. 2, which controls the PWPOST lines in FIG. 2.

If the processor P2 wishes to post another block of data (to any memory bank at all, including M2), P2 first examines its line PWPOST_2. If the line is active, the processor P2 refrains from all postings until the line goes inactive, at which time P2 resumes the posting. Thus, P2 posts no further data until previous data has been both posted and written. The PWPOST lines are under control of the memory banks. When posting is begun, the memory controller which receives the posted data activates the PWPOST line of the posting processor. (The controller is able to identify the posting processor because the controller contains apparatus, known in the art, and used for other purposes, which identifies the posting processor.) Apparatus which controls the PWPOST lines, and which is located in each controller, is schematically shown in FIG. 3. There are numerous ways to construct such apparatus, as known in the art.

With this apparatus, no data can be posted to any memory banks by the processor until the previous data has been written to its intended memory. Since the control byte is the last byte to be posted, it will not be written until the previous data has been written, and the problem described in the Background will not occur.

Alternate

The controller need not hold the PWPOST line active until completion of writing of the posted data. Instead, the controller can de-activate upon the completion of the cache invalidation, if necessary, and the initiation of writing. Under this procedure, there is no danger, because it is not possible to read the (old) data already present in the memory (and thus obtain stale data), because the controller denies access to the memory until the writing of the posted data has been finished.

Second Alternate

In the discussion given above, the processors act as policemen: the processors police themselves, in the sense that they refrain from posting data so long as their respective PWPOST lines are active (although the processor retains the power to do posting). An alternative approach is to allow the memory controllers to act as police.

For example, when a processor contacts a memory controller and requests permission to post a write, the controller, in response, examines all of the PWPOST lines. If the requesting processor's PWPOST line is active, the controller denies permission, unless the controller itself was the cause of driving the line active. With this method, the processors do not need to examine the PWPOST signals.

As a specific example, assume that no writings of posted data are pending. Processor P1 in FIG. 2 requests permission to post data to M0. In response, M0 CONTROLLER examines the PWPOST lines, finds none active, grants permission, and activates PWPOST_1. Now, Processor P1 seeks permission to post data to M2. M2 denies permission, based on its finding that PWPOST_1 is active. If P1 seeks permission after PWPOST_1 goes inactive, M2 grants permission.

Significant Points

The processors are prevented from posting data while their PWPOST lines are active by hardware, known in the art.

The controllers actuate the PWPOST lines by the procedures illustrated in FIG. 3. These procedures are implemented by hardware circuits, which can be constructed in numerous ways, known in the art, once the specification of FIG. 3 is known.

Figure 4:
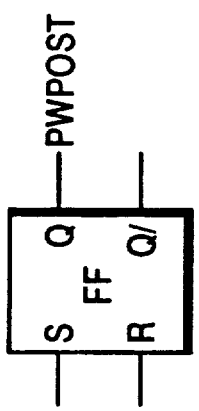
FIG. 4 illustrates a truth table.

For example, the implementation of FIG. 3 can be based on the truth table shown in FIG. 4, which is burned into memory. The inputs would be the WRITE REQUEST (or, perhaps more correctly, POST REQUEST), processor identities, and WRITE COMPLETE signals. The output columns labeled "S" indicate the SET input of a flip-flop, such as that shown in the Figure. Each PWPOST line is driven by the Q output of a respective flip-flop.

Thus, according to the truth table, a WRITE REQUEST causes the flip-flop for the proper PWPOST line to be set (Q goes HIGH), driving that line active. When the WRITE COMPLETE signal is received from the controller, the flip-flop is reset, driving the PWPOST signal inactive (Q goes LOW). Implementation of truth tables is known in the art. Other approaches can be taken, in addition to the two examples just given.

It should be recognized that FIG. 4 is actually another type of representation of the information contained in FIG. 3, and need not itself be viewed as an embodiment.

From one perspective, the invention prevents issuance of a signal (such as the control word) indicating a data block has been written, when the data has been merely posted.

Numerous substitutions and modifications can be undertaken without departing from the true spirit and scope of the invention. What is desired to be covered by the issuance of Letters Patent is the invention as defined in the following claims.

We claim:

1. In a computer
   (A) having a first processor and a second processor, the first processor being able to write a data block which includes a data word and a control word to a first memory bank and a second memory bank, and
   (B) in which the first processor can post the data word to the first memory bank before the data word is written thereto and the first processor can post the control word to the second memory bank before the control word is written thereto, the data word being posted prior to the control word being posted, and
   (C) the second processor being able to read the control word from the second memory bank prior to the first processor initiating writing of the data word to the first memory bank, and
   (D) completion of writing of the data word to the first memory bank is indicated by writing of the control word to the second memory bank,
   the improvement comprising:
   a) means for ascertaining posting of the data word to the first memory bank by the first processor and generating a command signal in response thereto; and
   b) means, responsive to the command signal, for preventing writing of the control word to the second memory bank until writing of the data word to the first memory location has been initiated.

2. In a memory system within a computer having
   (A) a first processor and a second processor, and
   (B) a first memory bank with an associated first controller and a second memory bank with an associated second controller,
   in which (C) the first processor is able to post a first portion of a data block to the first controller for later writing to the first memory bank and the first processor is able to post a second portion of the data block to the second controller for later writing to the second memory bank, and (D) the second processor is able to read the second portion of the data block from the second memory bank prior to the first processor writing the first portion of the data block to the first memory bank, the improvement comprising:
   a) apparatus which detects the initiation of the posting of the first portion of the data block and generates a command signal in response thereto; and
   b) means, responsive to the command signal, for preventing the second portion of the data block from being written to the second memory bank before the first portion of the data block is written to the first memory bank.

3. A computer, comprising:
   a) a first processor and a second processor, each processor being capable of producing a WRITE REQUEST signal and subsequently posting data for writing;
   b) a plurality of signal lines, each processor having one signal line of said plurality of signal lines connected thereto;
   c) a first memory bank with an associated first controller and a second memory bank with an associated second controller, the first processor being able to post a data word of a data block to the first controller for later writing to the first memory bank and the first processor being able to post a control word of the data block to the second controller for later writing to the second memory bank, and further the second processor being able to read the control word of the data block from the second memory bank prior to the first processor writing the data word of the data block to the first memory bank, the first controller and the second controller each having
     i) a buffer for holding posted data, and
     ii) apparatus for receiving one of the processor WRITE REQUEST signals and activating the signal line of the associated processor in response thereto;
   c) means, responsive to activation of the signal line of the associated processor, for preventing the associated processor from making further postings of data.

4. In a computer, a method of storing a data block in a first memory bank having an first associated memory controller and a second memory bank having an second associated memory controller, comprising the following steps:
   a) providing a first processor and a second processor, the first processor being able to post a first part of a data block to the first memory controller for later writing to the first memory bank and the first processor being able to post a second part of the data block to the second memory controller for later writing to the second memory bank, and further the second processor being able to read the second part of the data block from the second memory bank prior to the first processor writing the first part of the data block to the first memory bank;

b) providing a bus carrying PWPOST signal lines,
   i) each of the PWPOST signal lines being available to the first memory controller and the second memory controller, and
   ii) each of the PWPOST signal lines being available to the first processor and the second processor;
c) when one of the processors first requests one of the memory controllers to accept posting of one of the parts of the data block, causing the one memory controller to
   i) identify the one processor, and
   ii) actuate the associated PWPOST signal line for the one processor; and
d) preventing the one processor from posting data to either the first memory controller or the second memory controller while the associated PWPOST signal line is actuated.

* * * * *